United States Patent [19]

Ostrander

[11] Patent Number: 5,810,542
[45] Date of Patent: Sep. 22, 1998

[54] LOAD SECURING DEVICE FOR A VEHICLE AND METHODS OF CONSTRUCTING AND UTILIZING SAME

[76] Inventor: Jerry Ostrander, 2565 Ackley, Westland, Mich. 48185

[21] Appl. No.: 645,181

[22] Filed: May 13, 1996

[51] Int. Cl.⁶ ...................................................... B60R 9/10
[52] U.S. Cl. .......................... 414/462; 224/497; 224/509; 280/490.1
[58] Field of Search .............................. 280/490.1, 491.4; 414/462; 40/153; 224/497, 498, 500, 501, 504, 506, 509

[56] References Cited

U.S. PATENT DOCUMENTS

| | | | |
|---|---|---|---|
| 4,033,601 | 7/1977 | Lindahl et al. | 280/490.1 |
| 4,050,616 | 9/1977 | Mosow | 224/497 |
| 4,400,129 | 8/1983 | Eisenberg et al. | |
| 4,411,461 | 10/1983 | Rosenberg | |
| 4,676,414 | 6/1987 | Deguevara | 224/500 |
| 4,697,975 | 10/1987 | Lippold | |
| 4,856,686 | 8/1989 | Workentine | 224/497 |
| 5,011,361 | 4/1991 | Peterson | |
| 5,094,373 | 3/1992 | Lovei | |
| 5,096,102 | 3/1992 | Tolson | |
| 5,169,042 | 12/1992 | Ching | |
| 5,190,195 | 3/1993 | Fullhart et al. | |
| 5,232,133 | 8/1993 | Speer | 224/497 |
| 5,232,135 | 8/1993 | Marren | 224/509 |
| 5,423,566 | 6/1995 | Warrington | |
| 5,443,189 | 8/1995 | Hirschfeld | 224/504 |
| 5,454,496 | 10/1995 | Sumida, Jr. | |

*Primary Examiner*—Karen B. Merritt
*Assistant Examiner*—Gregory A. Morse
*Attorney, Agent, or Firm*—Weiner, Carrier, Burt & Esser, P.C.; Joseph P. Carrier; Irving M. Weiner

[57] ABSTRACT

A load securing device for a vehicle includes a hitch mechanism securable to a vehicle for selectively fixing a trailer to the vehicle for being towed thereby, a load carrying mechanism for carrying loads externally of the vehicle, and a fastening mechanism for fastening the load carrying mechanism to the hitch mechanism such that both the load carrying mechanism and the hitch mechanism may be simultaneously used. The hitch mechanism is adjustable such that a trailer-engaging hitch member thereof may be stably disposed at different vertical levels relative to the vehicle, and the hitch mechanism is also adjustable such that the hitching member may be disposed at different longitudinally projecting positions relative to the vehicle. The load carrying mechanism is adjustable in longitudinal, lateral and vertical dimensions for securing different size and shape loads, and the fastening mechanism is also adjustable for fastening the load carrying mechanism to the hitch mechanism in both an operative, erect position thereof and a collapsed, storage position thereof. A device also includes a theft deterrence mechanism for selectively locking the load carrying mechanism to the hitch mechanism in both the operative and storage positions thereof.

20 Claims, 4 Drawing Sheets

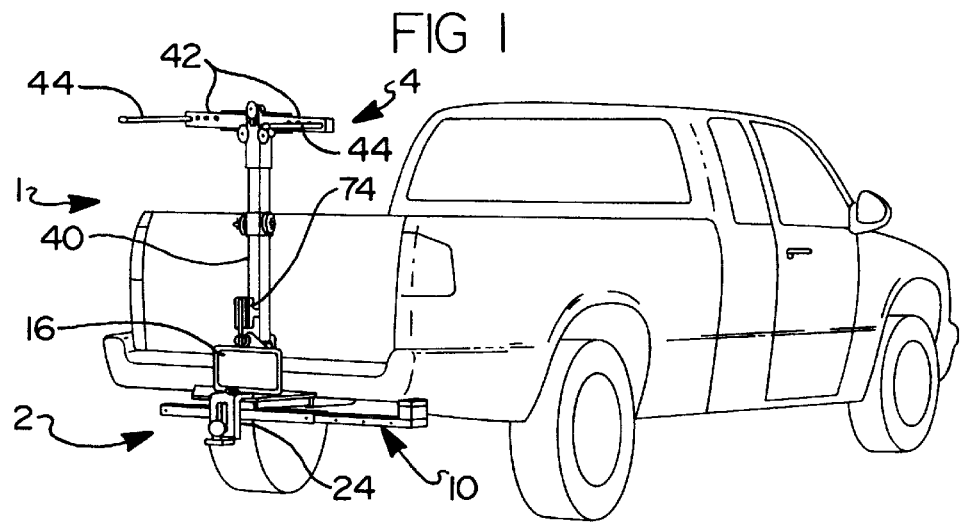
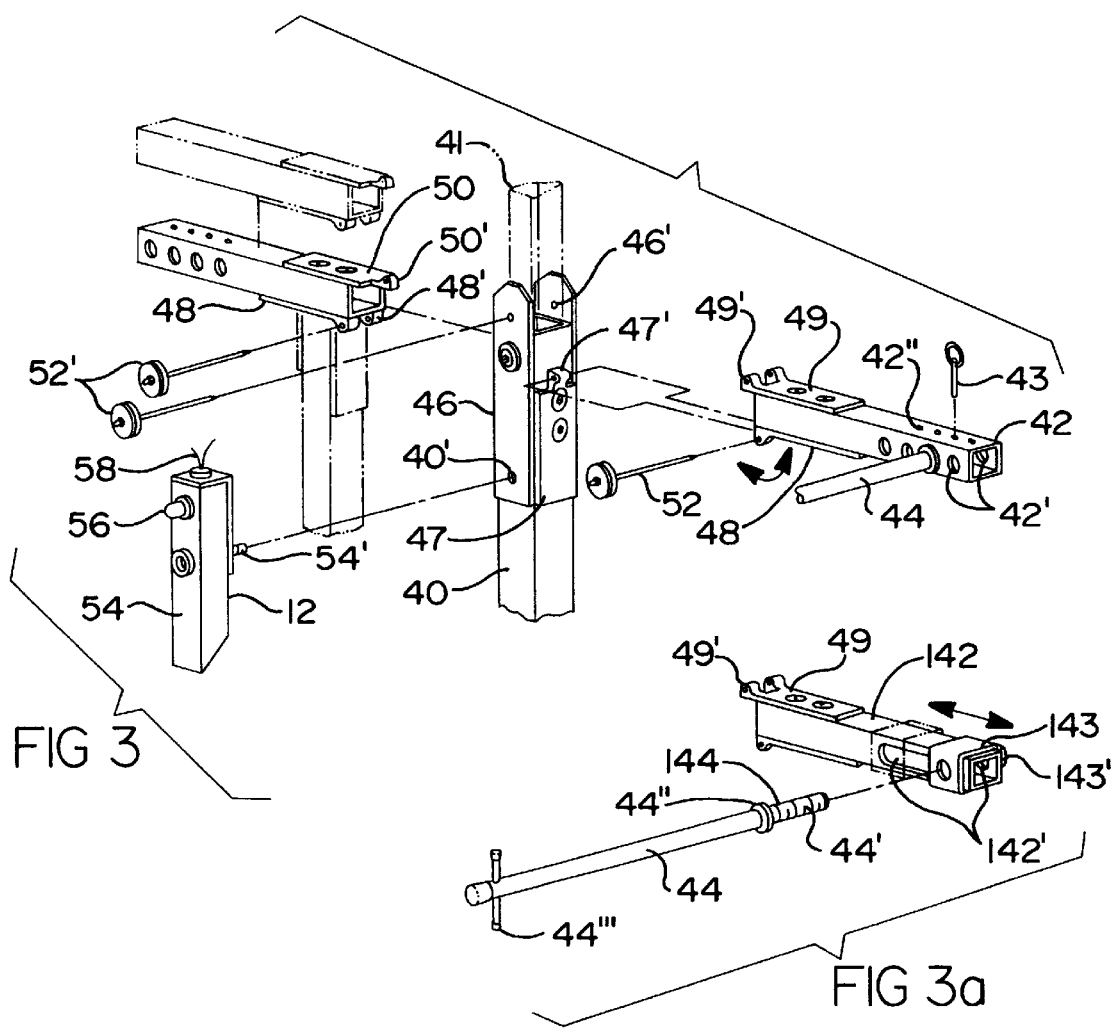

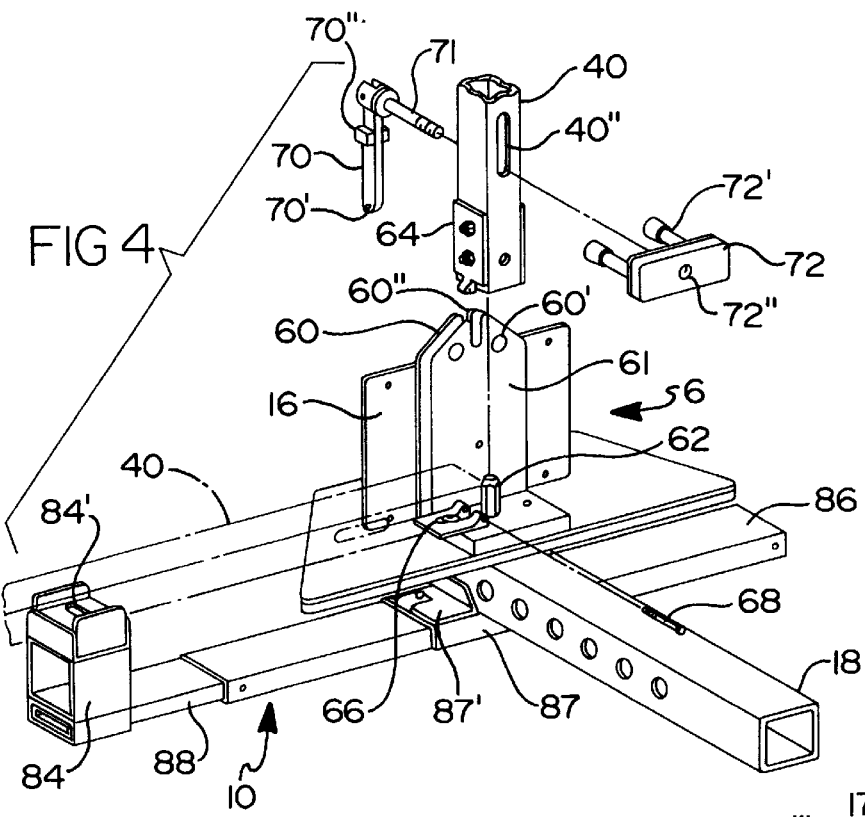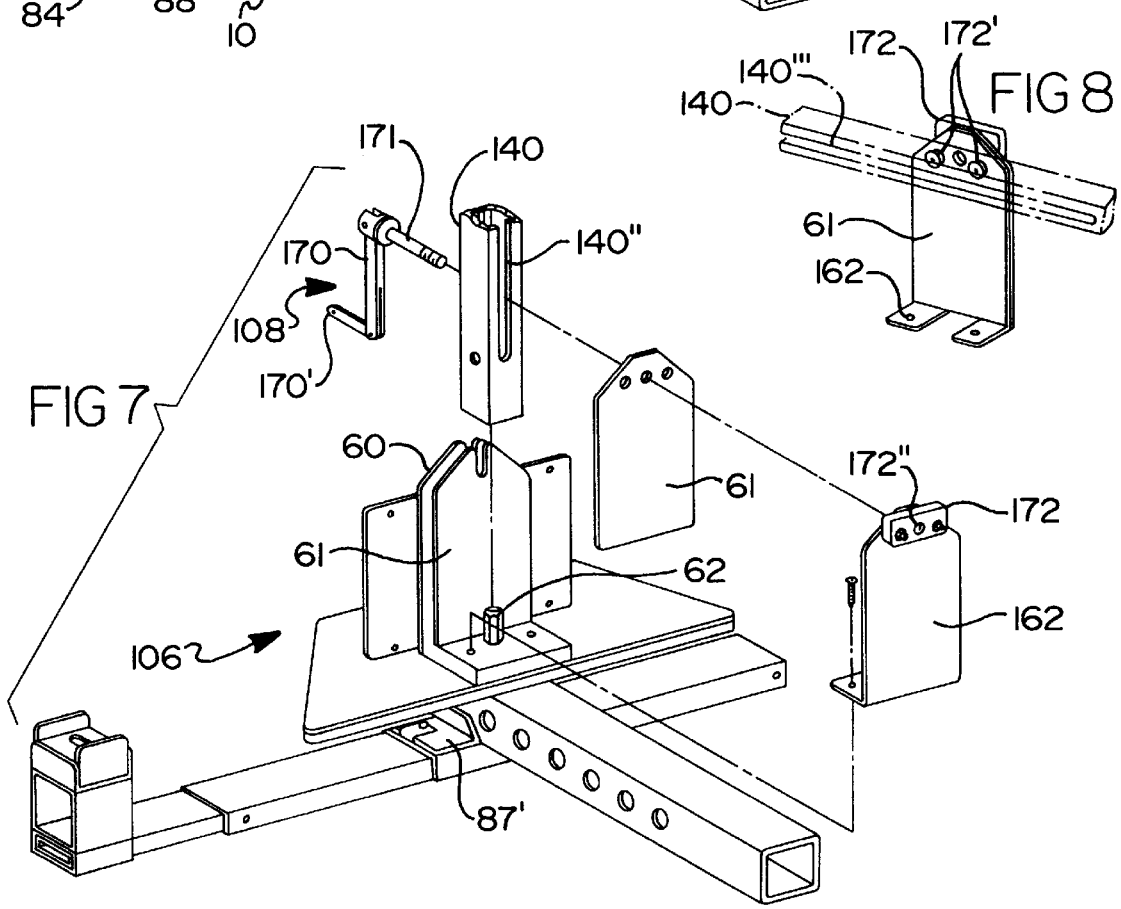

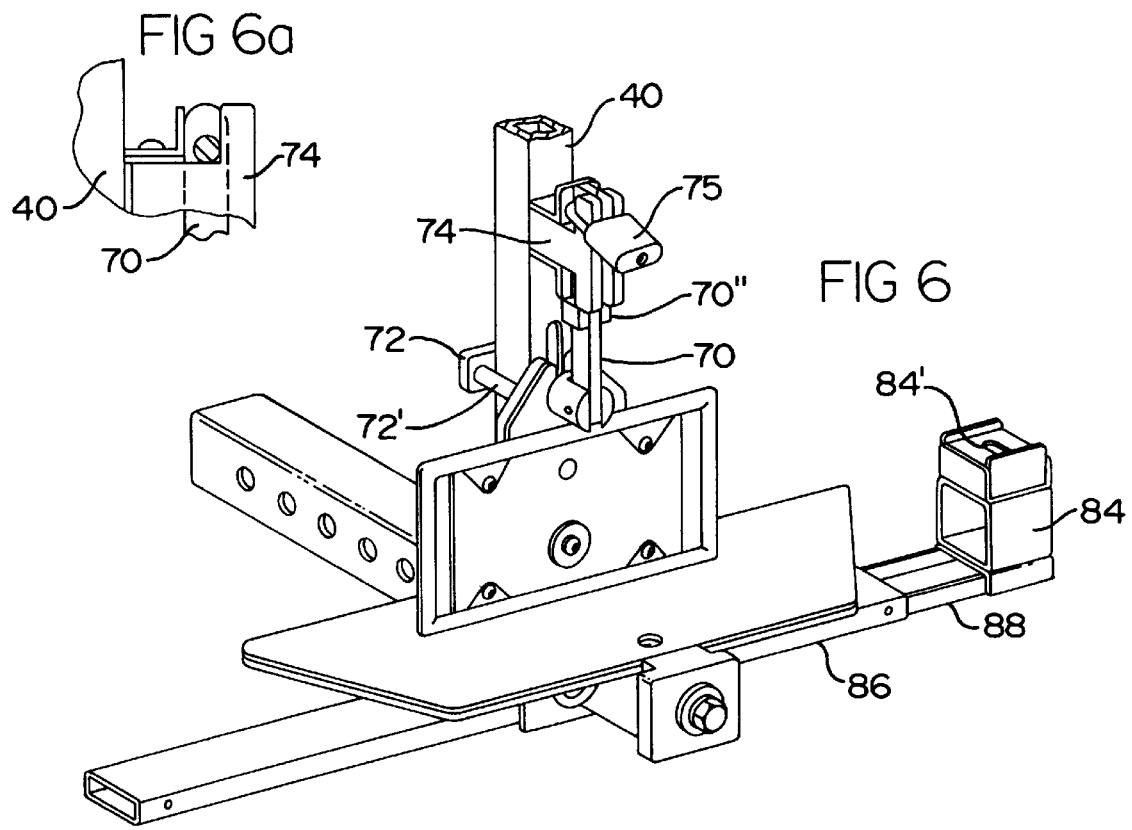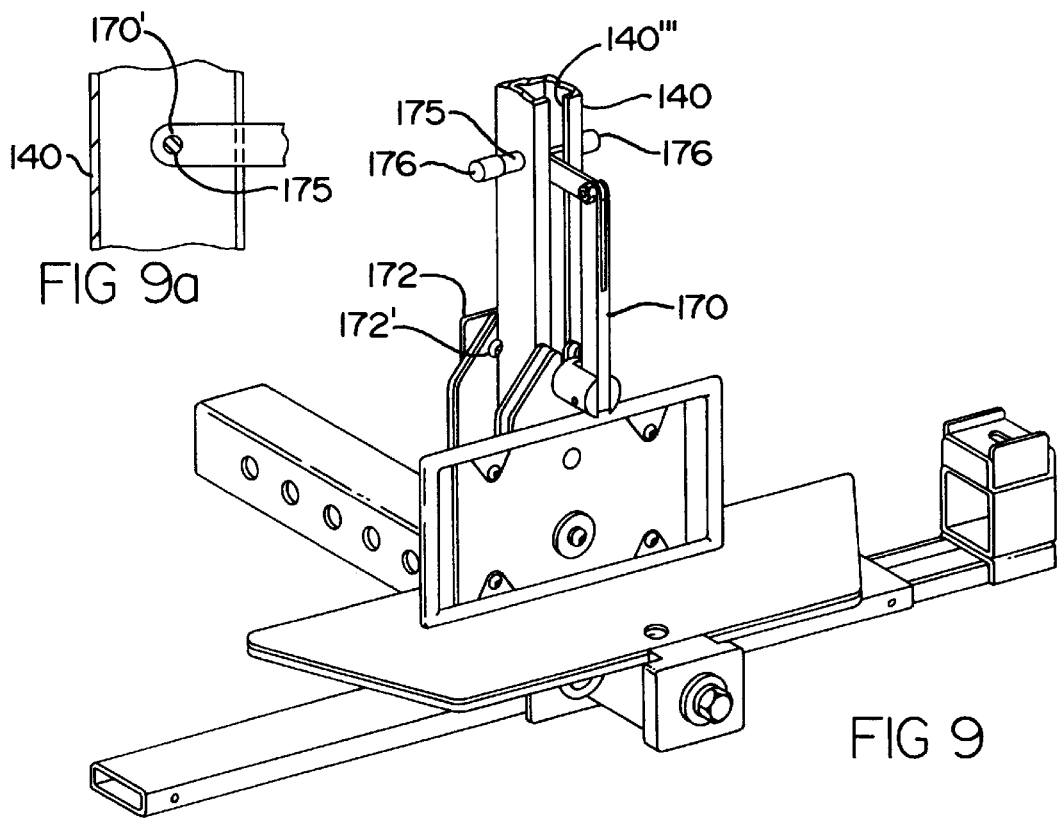

5,810,542

LOAD SECURING DEVICE FOR A VEHICLE AND METHODS OF CONSTRUCTING AND UTILIZING SAME

BACKGROUND OF THE INVENTION

1. Field of the Invention

The present invention pertains to a versatile and adjustable load securing device for a vehicle which is useful for towing loads from and otherwise securing loads to the vehicle or other support base, and to methods of constructing and utilizing same. More particularly, the present invention pertains to such a load securing device including both a hitching mechanism and an external load carrier which may be simultaneously used, are both highly adjustable, and yet are relatively simple in structure.

2. Description of the Relevant Art

There are many known hitching devices for hitching trailers and the like to vehicles for being towed there behind, such as a vertically adjustable hitch disclosed in U.S. Pat. No. 5,358,269, and there are also many known load securing devices for securing various loads such as bicycles and wheelchairs to a vehicle externally thereof. In fact, there are many known devices in which a portion of a hitching mechanism may alternatively be used to either tow a trailer behind or in front of a vehicle or to connect an external load carrier such as a bike rack or a wheelchair support to the vehicle. Some such devices are disclosed in U.S. Pat. Nos. 4,697,975; 5,067,641; 5,169,042; 5,190,195; and 5,094,373; 5,423,566; and 5,454,496. With all of such known devices, however, the user must choose between having the device function as a trailer towing device or as an external load carrier because the disclosed devices cannot perform both functions simultaneously.

Moreover, the known devices also suffer from other limitations and disadvantages. These include: limited or no ability for adjustment of the load carrying device to accommodate different sized and different shaped loads; limited or no ability for adjustment of the hitch mechanism to accommodate trailers at different vertical levels above the ground surface and at different distances from the rear or front of the vehicle; limited or no ability to move the load carrying device to a convenient storage position, while maintaining a high level of security of the device in both operative and storage positions thereof; difficulty in placing objects on or removing objects from the load carrying device due to an elevated position thereof; limited or no ability for allowing the load carrying device to be easily mounted to or to be removed from a vehicle or other suitable support base; limited or no ability to mount and remove optional accessories thereto; etc.

Of course, some of the known devices address some of these limitations, but only in a partial sense and typically by adding significant complexity to the device. For example, the devices disclosed in U.S. Pat. Nos. 5,094,373, 5,190,195, 5,169,042 and 4,697,975 permit the load carrying device to temporarily be moved to a lowered position to permit access to the trunk or rear door of the vehicle, to give the device a more compact profile when not in use, or to facilitate loading of objects onto the device. With each of these devices, however, either the device cannot be maintained in its lowered position during a traveling operation of the vehicle, the device is not properly securable against theft and the like in the lowered position and/or the device still provides an undesired instruction to other functions of the vehicle even when the device is in its lowered position. Further, the devices disclosed in U.S. Pat. Nos. 4,697,975, 4,400,129, and 5,094,373 are relatively complex due to the adjusting features thereof.

SUMMARY OF THE INVENTION

The present invention has been developed to overcome the foregoing disadvantages and limitations attendant known trailer hitch and external load carrying devices for vehicles, and to generally fulfill a great need in the art for a highly versatile load securing device for a vehicle which may simultaneously be used for towing a trailer from the vehicle and for securing external loads to the vehicle in a convenient manner, which may be conveniently stored on the vehicle when not in use without interfering with other normal functions of the vehicle, which provides a great deal of security in both operative and storage positions thereof, and which has a reliable, sturdy, and relatively simple structure.

According to the invention there is provided a load securing device for a vehicle, the device comprising hitch means securable to the vehicle for selectively fixing a trailer to a vehicle for being towed thereby, load carrying means for carrying loads externally of the vehicle, and fastening means for fastening the load carrying means to the hitch means such that both the load carrying means and the hitch means may be simultaneously used, or may be independently used without removal of the other.

Preferably, the hitch means is both vertically adjustable and longitudinally adjustable relative to the end (front or rear) of the vehicle so that it may be used with substantially any vehicle for towing substantially any trailer. Such adjustability is also desirable for permitting the load carrying means to carry different size loads without interfering with the trailer towed by the vehicle.

It is also preferable that the load carrying means is adjustable for carrying different size and different shape objects, particularly that the load carrying means is adjustable in at least two dimensions relative to the vehicle or other support base, and most preferably in three dimensions relative to the vehicle; and that the fastening means is adjustable for fastening the load carrying means to the hitch means or other support base in multiple different positions of the load carrying means, and most preferably the fastening means may be used to selectively fasten the load carrying means in an operative position extending substantially vertically relative to the vehicle or other support base, and a storage position extending substantially horizontally relative to the vehicle or other support base. The great adjustability of the load carrying means is desirable for securing different size and different shape objects, while the adjustable fastening means permits the load carrying means to be conveniently stored on the vehicle or other support base when not in use and so that it does not interfere with normal operations or use of the vehicle or other support base, and which permits the load carrying means to be quickly and easily removed or relocated altogether.

Still preferably, the load securing device according to the invention will include a theft deterrence means which is useful for securing the load carrying means to a vehicle or other suitable support base in both the operative and storage positions thereof.

According to another aspect of the invention there is also provided a load securing device comprising load carrying means for carrying loads externally of a vehicle or other suitable support base; and adjustable fastening means for fixing the load carrying means to the vehicle or other support base in multiple different positions, including an operative, extended position and a collapsed, storage position. Preferably, the load carrying means is adjustable in at least two dimensions while in the operative position thereof for supporting objects having different shapes and sizes, and is collapsible to a compact size when in the storage position thereof; while the device further preferably includes theft deterrence means for locking the load securing means to the vehicle or other support base.

According to still another aspect of the invention, there is provided an adjustable trailer hitch for a vehicle, comprising mounting bracket means for being fixed to a vehicle; and adjustable hitch means connectible to the mounting bracket means and including a trailer hitching member and means for stably supporting the trailer hitching member anywhere within a range of vertical positions relative to the vehicle. Preferably the stable supporting means includes a sliding support bracket operatively connected to the trailer hitching member.

It is an object of the present invention to provide the load securing device for a vehicle which may be conveniently, simultaneously used for both towing the trailer from the vehicle and securing both such as bike rack, wheelchair, etc. to the vehicle externally thereof and which allows independent use of the trailer towing and load carrying features thereof without removal of major components relating to the other non-used features.

It is a further object of the invention to provide such a load securing device which permits quick easy assembly and removal of optional accessories and components to the device, as well as quick and easy assembly/disassembly of the device itself.

A further object of the invention is to provide such a load securing device which allows easy breakdown of the hitching and load securing features thereof, so that these features may selectively be used singularly or in different combinations.

It is another object of the invention to provide such a load securing device which is highly and easily adjustable with respect to both the hitch function and the load carrying function thereof.

It is yet another object of the invention to provide such a load securing device which may be conveniently stored on the vehicle when not in use for carrying external loads without interfering with normal functions of the vehicle.

It is yet another object of the invention to provide such a load securing device having high strength, durability and reliability.

It is still a further object of the invention to provide such a load securing device which can provide fast deterrence in a simple, yet reliable manner.

It is yet another object of the invention to provide such a load securing device capable of performing all of the foregoing functions, and which is also relatively simple and economic to manufacture.

Other objects, advantages, and salient features of the invention will become apparent from the following detailed description which, together with the annexed drawings, describes presently preferred embodiments of the invention.

BRIEF DESCRIPTION OF THE DRAWINGS

FIG. 1 is a rear perspective view of a pick-up type vehicle having a load carrying device according to a first preferred embodiment of the invention mounted thereon, the device being shown in an operative, extended position thereof.

FIG. 3 is an exploded, perspective view of an upper portion of the load carrying device of FIG. 1, the drawing showing lateral load supporting arms with different types of lateral adjustability.

FIG. 3a is an exploded, perspective view of a modified portion of FIG. 3.

FIG. 4 is a front perspective view of a lower portion of a load securing device in FIG. 1, and particularly showing a fastening means between a hitch means and an external load carrying means of the load securing device.

FIG. 6 is a rear perspective view of the device of FIG. 1 with a load carrying means thereof secured in the operative position thereof.

FIG. 6a is an enlarged, partially sectional side view of a locked part of the device in FIG. 6.

FIG. 7 is a front perspective view of a load securing device similar to FIG. 4, but showing a second embodiment of the invention.

FIG. 8 is a rear perspective view of a portion of the fastening means of the second embodiment of FIG. 7, wherein a main support shaft of an external load carrying means is partially shown in broken lines in a storage position thereof.

FIG. 9 is a view similar to FIG. 6, but showing the second embodiment of the invention.

FIG. 9a is an enlarged, partially sectional side view of a locked part of the device of FIG. 9.

DETAILED DESCRIPTION OF THE PREFERRED EMBODIMENTS

Figure 2:
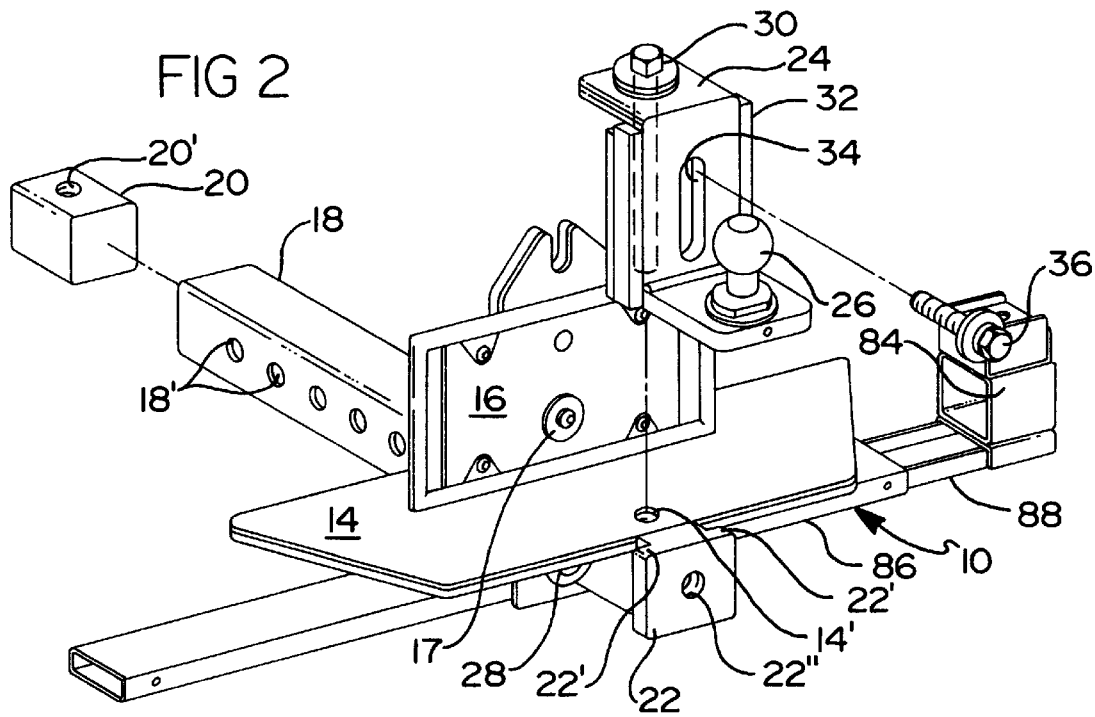
FIG. 2 is a rear perspective view of a lower portion of the carrying device of FIG. 1.

Referring to FIGS. 1–6a, there is shown a load securing device 1 for a vehicle according to the first preferred embodiment of the invention. The load securing device 1 generally includes a hitch means 2 for selectively fixing a trailer to the vehicle being towed thereby, a load carrying means 4 for carrying loads external of the vehicle, and fastening means 6 for fastening the load carrying means 4 to the hitch means 2 such that both the load carrying means 4 and hitch means 2 may be simultaneously used. Also, the load securing device 1 includes theft deterrence means 8, and auxiliary rigid support member 10, a utility light 12, a rigid stand plate 14, and a license plate holder 16.

With particular reference to FIGS. 1, 2, 4 and 6 the hitch means 2 preferably includes a conventional hitch mounting bracket generally shown in FIG. 1 which is fixed to the frame or body of the vehicle at a rear end thereof, a coupling tube 18 slidably receivable by the mounting bracket on the vehicle and connectable to the mounting bracket using a bolt, pin or other appropriate fastening means except engaged through an opening 18' on the coupling tube and a corresponding opening defined in a portion of the mounting bracket with which the coupling tube 18 is slidably engaged; and acceptor or coupling nut 20 which is slidably received within the coupler tube 18; a versatility plate 22 fixed to a rear end of the coupler tube; and adjustable height hitch bracket 24 securable to the coupler tube and the versatility plate 22; a hitch ball 26; and load securing rings 28 (one of which partially shown in FIG. 2) also fixed to the coupler tube 18. The coupler tube 18 has a plurality of the openings 18' defined in a spaced manner along the longitudinal length thereof for permitting the rear end of the coupler tube (the versatility plate 22) to be positioned at different longitudinally spaced distances from the rear end of the vehicle. The longitudinal adjustability is desirable for adjusting the securing device 1 to be used on different vehicles and in relation to different trailers, and also for providing sufficient space between the vehicle and a towed trailer to accommodate different objects which may be attached to the load carrying means 4.

The adjustable hitch bracket 24 includes a flat upper portion which is fixed to the coupling tube 18 using an elongate, threaded bolt 30 which is threaded through an opening 20' extending vertically through the acceptor nut 20, a central, vertical portion having a pair of L-shaped guide members 32 fixed to the lateral sides thereof thus forming a shallow channel on either side and an elongate slot 34 through which a fixing bolt 36 extends so that it may be threadedly fixed to a threaded central opening 22" defined longitudinally in the versatility plate 22, and a flat lower portion having the hitch ball 26 fixed thereto. The bracket 24 may be otherwise constructed. For example, the ball 26 may be attached to an upper portion of the bracket, a middle portion of the bracket, etc. The threaded bolt 30 preferably has a washer and nut (not shown) loosely provided thereon below the flat upper portion of the bracket 24 such that the bolt 30 cannot be removed from the bracket, but also such that the bolt may be freely rotated relative to the bracket 24 as it is screwed into the acceptor nut.

The L-shaped guide members 32 and the vertical intermediate portion of the hitch 24 are shaped to wrap around and slidably engage projecting shoulders 22', respectively, by wrapping around these shoulders on the lateral side of the versatility plate 22, the engagement between these components providing additional strength and rigidity to the connection between the hitch plate 24 and the coupling tube 18 besides that provided by the bolts 30, 36.

For adjusting a height of the hitch bracket 24 relative to the coupling tube 18, the bolt 36 extending through the elongate slot 34 is loosened in its engagement with the threaded opening 22" in the versatility plate 22. The elongate bolt 30 is cranked to move the hitch plate 24 either upwardly or downwardly to a desired vertical position, and then is a bolt 36 is re-tightened in its engagement with the threaded opening 22". The elongate opening 34 is of sufficient length such as 3–6 inches, to permit the hitch ball 26 to be moved to a corresponding range of possible positions. As shown, an opening 14' as defined in the stand plate through which the elongate bolt 30 extends into the coupling tube 18 so as to be threadedly engaged with the acceptor nut 20.

The acceptor nut 20 desirably permits installation/adjustment removal of the hitch bracket 24 with a single wrench or socket, which would fit the heads of both bolts 30, 36. If desired, however, the acceptor nut 20 could be omitted, with screw threads instead being defined in the opening 14' of the stand plate and/or in a corresponding opening defined in the coupling tube 18. Additionally, the trailer height hitch bracket 24 may be omitted from the load securing device, and instead the hitch ball 26 be directly coupled to the coupling tube 18 by being threaded into the opening 20' of the acceptor nut and extending through the opening 14' of the stand plate and a corresponding opening in a coupling tube; or hitch ball 26 could extend through the opening 14' in the stand plate and through openings defined in opposite sides of the coupling tube 18, and then have a lower threaded end thereof secured by a nut disposed relative to a bottom surface of the coupling tube 18. Even if the adjustable hitch bracket 24 is not used, the versatility plate 22 may still be used for securing other auxiliary components to the device 1 or to the coupling tube 18, and if nothing is connected to the plate 22, it functions as a bumper plate for protecting the device against contact with external objects. The acceptor nut 20, the versatility plate 22 and the bolt 36 collectively function as a mounting means for mounting various objects, such as bracket 24, to the coupling tube 18. Moreover, the hitch means 2, with or without the bracket 24, may be used independently of the load carrying means 4.

Referring to FIGS. 1, 3, 4 and 6, the load carrying means 4 according to the first preferred embodiment of the invention includes a main support shaft 40, a pair of lateral support arms 42 collapsibly secured to an upper end of the main shaft 40, and object engaging member 44 projecting rearwardly from the lateral support arms 42. The main support shaft 40 is preferably a straight, elongate tubular member as depicted having a lower end which is secured to the hitch means 2 (to the upper surface of the stand plate 14 which is fixed to the hitch means 2) through the fastening means 6 such that the shaft 40 may either be positioned in an erect, operative position as shown in FIG. 1 or in a collapsed, substantially horizontal position as indicated by the broken lines in FIG. 4. Such movement between the operative and storage positions will be discussed further hereinbelow in relation to the fastening means 6.

The lateral support arms 42 are preferably collapsibly, pivotally connected to the upper end of the main support shaft 40 by way of cooperating pin plates 46 disposed on opposite sides of the upper end of shaft 40, pivot brackets 47 provided on two other opposite surfaces of the support shaft 40, pivot brackets 48, 49, 50 provided on the lateral support arms 42, and hinge pins 52 which may be selectively engaged with the pin plates and brackets as shown in FIG. 3. More particularly, each of the brackets 47 has hinge bosses 47' provided on opposite sides thereof (only one such boss 47' as shown in FIG. 3) which are adapted to be operatively engaged by corresponding bosses 48' provided on the bracket 48 and, while the hinge pins 52 are selectively inserted through the engaged bosses 47', 48' for pivotally securing the lateral support arms 42 to the main support shaft 40. Further, when the lateral support arms 42 are pivotally connected to the main support shaft 40 through the bosses 47', 48' as discussed, the arms 42 may then be pivoted upwardly to operative positions thereof (in which they extend perpendicularly to the main support shaft 40), at which time a boss 49' on the bracket 49 is lined with a boss 50' on the bracket 50 and with openings 46' in the plates 46, so that a third hinge pin 52 may be inserted through the openings 46' and through openings formed in the bosses 49', 50' so as to lock the support arms in their upright, uplift positions. If the third hinge pin is not inserted through the openings 46' and the boss 49', 50', the lateral support arms 42 will pivot downwardly to collapsed positions thereof extending substantially parallel to the main support shaft 40. The structure of the brackets 49, 50 permits the lateral support arms 42 to be joined together in a collapsed position thereof on either side of the main shaft 40 for storage purposes. Particularly, if the right hand side support arm 42 remains pivotally connected to the bracket 47, the other support arm 42 may be disconnected from the bracket 47, and the boss 50' of the bracket 50 may be pivotally connected to the boss 49' of the bracket 49 using one of the hinge pins 52 so that both of the lateral support arms 42 will pivot downwardly parallel to the main support shaft 40 on the same side of the shaft.

In FIG. 3, the brackets 47 and plates 46 are shown as being attached to the shaft 40 with screws/bolts which are preferably, threadedly received by threaded openings defined in the shaft 40 or by threaded coupling nuts disposed within the shaft, but these components could be connected to the shaft using other appropriate fastening means such as welding; and the plates 46 and brackets 47 could be formed as a single collar or member which is attached to the shaft. The brackets 48–50 could similarly be constructed and attached to the arms 42 other than in the specific manner shown in the drawings.

The pivot pins 52 preferably have enlarged ends 52' provided on one end thereof to function as handles for conveniently manipulating the pins, while pin locks (not shown) may be provided on opposite ends of the pins 52 for locking the pins in position on the brackets 47, 48, 49, 50.

As shown in FIG. 3, the lateral support arms 42 each have a plurality of large openings 42' defined in a spaced manner along a longitudinal length thereof on opposite faces thereof for selectively receiving their through ends of the object engaging member 44; while lateral support arms also have smaller openings 42" defined therein in a longitudinally spaced manner on upper and lower surfaces thereof for receiving therethrough ends of locking pins 43. Normally a pair of the object engaging members 44 will be used with the load securing device 1, i.e., one of the object engaging members 44 being operatively connected to each of the lateral support arms 42, although more than two of the object engaging members 44 may be used if desired. The object engaging members 44 have openings 44' defined through first ends thereof for receiving the locking pins 43 therethrough, and will also preferably include an annular flange 44" which abuts against the side face of the lateral support arm 42 for limiting the length of the object engaging member 44 which may be inserted through the openings 42' in the lateral support arms 42, and limiting projections 44'" provided in the opposite end of the object engaging members 44 to assist in securely maintaining objects on the engaging members. The limiting projections 44'" are preferably aligned with the openings 44' so that the projections 44'" will extend substantially vertically when the engaging member 44 are secured to the support arms 42. Additionally, the object engaging members 44 may be provided with a flexible coating or sleeve of a plastic foam or the like thereon to prevent scratching of objects which are engaged by the members 44; while the openings 42" on the upper and lower surface of the lateral support arms 42 could be omitted if the end portions of the object engaging members are sufficiently long to extend through the lateral support arms 42 and have the locking pins 43 inserted directly through the openings 44' outwardly of the side surface of the lateral support arms 42. Relatedly, the locking pins 43 could be replaced with a conventional padlock in such instance where they extend through the openings 44' outwardly of the lateral support arms 42. The collapsible construction of the load carrying means 4 is an important aspect of the invention because it permits the means 4 to be conveniently stored on the vehicle without interfering with normal functions of the vehicle.

Referring to FIG. 3a there is shown a modified lateral support arm 142 according to the invention. The hinge brackets 48, 49 provided on the modified arm 142 are the same as with the arm 42, but the mechanism by which the object engaging members 44 are connected to the lateral support arm 142 is modified from that of the lateral support arm 42. Particularly, modified support arm includes a pair of elongate slots 142' provided on opposite sides thereof and a slidable collar 143 slidably disposed over one end of the arm 142. In this modification, the object engaging members 44 will be provided with a threaded end 144 as an alternative to or in addition to the opening 44'. The threaded end 144 is inserted through the slidable collar 143, the elongate openings 142' and then screwed into a threaded nut or similar member 143' fixed to one side of the collar 143. In the first embodiment, the load carrying means 4 may be adjusted in a lateral dimension by moving the object engaging members 44 into different ones of the openings 42' in the lateral support arms 42; while in the modified embodiment, the lateral dimension of the load carrying means is adjusted by loosening the threaded engagement between the threaded end 144 of the member 44 and the nut 143' of the sliding bracket 143, sliding the bracket 143 to a desired position along the support arm 142 and re-tightening the threaded engagement between threaded end 144 and the nut 143'.

According to a preferred aspect of the invention, the main support shaft 40 of the load carrying means 4 will be vertically adjustable in height through a telescopic arrangement of an inner tube shown in broken lines in FIG. 3 slidably received within the main shaft 40 and locking means for selectively locking the inner tube at different positions in relation to the main shaft. Given the presence of the theft deterrence means 8 within a lower portion of the main support shaft 40 in this embodiment of the invention, the inner tube 41 will preferably be provided in relation to an upper portion of the main shaft 40 so as not to interfere with the theft deterrence means 8. More particularly, the plates 46 and brackets 47 may be fixed to the upper end of an inner, sliding shaft 41, the sliding shaft will have a plurality of threaded openings defined in a spaced manner along a longitudinal length of the inner shaft on opposite sides thereof, the upper end of the main shaft 40 will have openings defined therein, and the inner shaft 41 may be selectively fixed to the main shaft 40 at different vertical positions using bolts extending through openings in the upper end of the main support shaft 40 on opposite sides thereof and which are threadedly engaged with different ones of the threaded openings in the inner sliding shaft which are selectively aligned with the openings in the outer support shaft. Most preferably, such vertical adjustability feature will provide approximately 6–12 inches of vertical adjustment by forming the openings in the inner sliding shaft along a corresponding length thereof and which are spaced 1–2 inches apart.

The plates 46 and brackets 47 as connected to the upper end of the shaft 41, may be spaced slightly from the inner shaft 41 at lower ends thereof such that the lower ends of the plates 46 and brackets 47 will fit over the upper end of main shaft 40 when the inner shaft 41 is in a non-extended position thereof. Also, the plates 46 and brackets 47 may either be individually connected to the shaft 41 or be formed as a collar which is then secured to the shaft 41.

The utility light 12 as shown in FIG. 3 preferably includes a housing 54 which is selectively securable to an upper portion of the main support shaft using appropriate fastening means such as the depicted bolt 54' preferably engaged with a threaded opening 40' defined in the main support shaft and/or in a bracket 46, or with a coupling nut disposed in the shaft 40, a switch 56, and appropriate power source, such as the depicted electrical leads 58 which would be connected to a power source of the vehicle and which would preferably extend through the main support shaft 40 for being concealed thereby. Alternatively, the utility light 12 could include an internal battery as the power source rather than the electrical leads, and it could be permanently formed as a fixture to the main support shaft 40. Features of the theft deterrence means 8 and the fastening means 6 are provided to prevent damage to the electrical leads 58 extending through the main support shaft 40 as discussed further below.

Referring to FIG. 4, the fastening means 6 according to the first preferred embodiment of the invention preferably includes a face bracket 60 which is substantially L-shaped in profile, and which has a lower portion thereof fixed to the coupling tube 18 of the hitch means 2, to the stand plate 14, and to a mounting bracket 87 of the auxiliary rigid support means 10 using a single securing bolt which has a threaded end having nut 62 threaded thereover. More particularly, according to an important, preferred aspect of the invention, the coupling tube 18, the stand plate 14, the mounting bracket 87 and the face bracket 60 are joined together by a single, large-diameter bolt having a head which is disposed on a lower surface of the mounting bracket 87, a shaft which extends through the brackets 87,60, the plate 14 and the coupling tube 18, and has the nut 62 threadedly attached thereto. Applicant has found the single bolt as depicted, such as a ¾ inch diameter bolt, is sufficient to stably lock the mounting tube 18, a stand plate 14 and the brackets 60, 87 together.

The fastening means also includes pivot bracket 64, 66, pivot pin 68 for joining the pivot bracket 64, 66 and a cranking handle 70 including a threaded fastener 71, an associated receiver 72 for the threaded fastener, a slide lock member 76 (see FIG. 5) which is slidingly disposed within a lower portion of the main support shaft 40 of the load carrying means, and anti scratch gasket 61. The dimensions of the main support shaft 40 will be selected such that an inner perimeter thereof snugly, but slidingly receives the slide lock member 76, and the slide lock member is preferably a hollow member having an inner perimeter which snugly fits over the nut 62 so that when the member 76 is slid down over the nut 62 it adds a substantial degree of stability to the support shaft 40 in its erect, operative position.

For joining the main support shaft 40 to the face bracket 60, in an erect operative position of the shaft, the lower end of the shaft 40 is fitted over the nut 62, the member 76 is slid down to snugly engage the nut 62, the receiver 72 is fitted to the support shaft 40 such that projections 72' thereof extend on opposite sides of the support shaft and engage openings 60' in the bracket 60, the fastener 71 is inserted through elongate openings 40" provided in opposite sides of the support shaft 40 and through an elongate recess 60" defined in an upper surface of the face bracket 60, and is then tightly threaded into a threaded opening 72" defined in a central portion of the receiver 72 so as to tightly clamp the support shaft 40 to the bracket 60. Additionally, the hinge brackets 64, 66, which are respectively fixed to the main support shaft 40 and the face bracket 60 are then joined together using the hinge pin 68. The slide lock member 76 may be slid within the shaft 40 by moving the fastener 71 of the handle 70 upwardly and downwardly along the elongate slots 40" in the shaft 40, noting that the fastener 71 also extends through openings 76' defined through opposite sides of the member 76. Optionally, an elastic biasing means (not shown) such as an elastic band may be disposed within the shaft 40 in operative engagement with the slide lock member 76 or with the fastener 71 as extended through the member 76 for normally urging the member upwardly away from the nut, which is helpful for manipulating the shaft 40 between positions thereof. The main support shaft 40 is held very stably in the erect position by the swivel-handle 70, fastener 71, the receiver 72, face bracket 60, slide lock member 76 and the nut 62.

According to an important aspect of the invention, the load carrying means 4 and the hitch means 2 may be used independently by each other. If only the hitch means 2 is to be used, the load carrying means need not be connected thereto. If only the load carrying means is to be used a suitable mounting bracket therefor, such as the face bracket 60, may be quickly and easily attached to a vehicle bumper, i.e., to a flat upper surface of a step-type bumper having a hitch-ball mounting hole therethrough, or any other suitable support base (which need not be associated with a vehicle), and then the load carrying means may be secured thereto in the manner as described above using fastening means 6.

For moving the shaft from the operative position thereof as shown in FIG. 1 to a collapsed, storage position thereof as generally shown by the broken line in FIG. 4, the fastener 71 is loosened in its engagement with the receiver 72 so that the receiver is disengaged from the openings 60' in the bracket 60, the slide lock member 76 is slid upwardly in the shaft 40 to disengage the nut 62, and the shaft is then pivoted downwardly about the pivot pin 68.

Referring to FIGS. 1, 6 and 6a, a first portion of the theft deterrence means 8 according to the invention comprises a lock up bracket 74 fixed to an intermediate portion of the main support shaft 40 a few inches above the elongate openings 40", and which is adapted to receive the free end of the handle portion of a swivel-handle 70, as well as a padlock 75 which extends through the opening 70' in the handle. With the handle locked to the security bracket 74, it is impossible to crank the handle and thus to disengage the main support shaft 40 from the bracket 60 when vertically mounted. The bracket 74 may be fixed to the shaft 40 using a bolt, by welding or by other appropriate fastening means. The dimensions of the bracket 74 and the handle 70 are preferably such that the padlock 75 extends with its lower surface facing upwardly when locked to the handle 70, making it difficult to cut the lock with the bolt cutters or the like.

Figure 5:
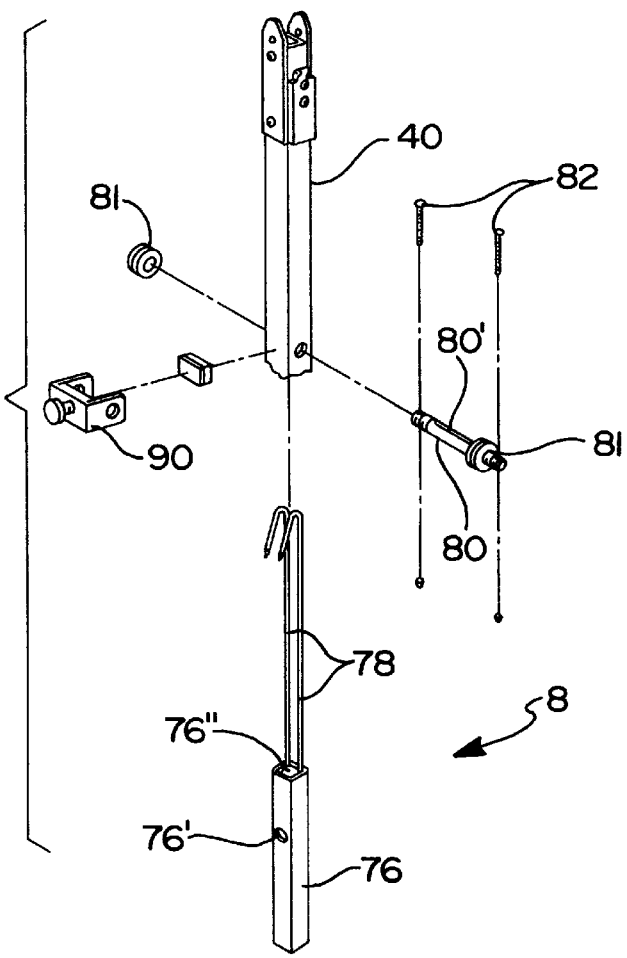
FIG. 5 is an exploded, perspective view of an internal, theft deterrence means of the load securing device of FIG. 1.

A second portion of the theft deterrence means is shown in FIGS. 5 and 6. Particularly, the second portion of the theft deterrence means 8 includes the slide lock member 76, a pair of J-shaped hooks 78 fixed to an upper portion of the slide lock member 76, a slotted pin 80 extending through an intermediate portion of the main support shaft 40, projecting members 82 and spacers 81 provided in opposite ends of the slotted pin 80 on opposite sides of the support shaft 40, and a receiving or locking bracket 84 provided on one end of the auxiliary, rigid, lateral support means 10. In operation, the slide lock member 76 may be slid downwardly within the main shaft 40 so that the ends of the J-hooks 78 are received within a slot 80' of the slotted pin 80. When so engaged, the J-hooks 78 prevent the pin 80 from being rotated. In order to achieve the locking function thereof, the swivel-handle 70 is cranked to loosen the engagement between the support shaft 40 and the face bracket 60, at which time the main shaft 40 may be moved from the erect, operative position thereof shown in FIG. 1 to a lowered, storage position thereof as shown by the broken lines in FIG. 4.

The rigid, lateral support member 10 includes a pair of telescopic members 86, 88 sliding received by each other, the mounting bracket 87 and fastening members 87' which are selectively used to connect the member 86 to the mounting bracket 87. The member 88 may be slid relative to the member 86 so that the member 88 may be extended laterally outwardly to position the locking bracket 84 to a position where it can receive one of the projecting members 82 on the slotted pin 80 through an elongate opening 84' formed in an upper surface of the locking bracket 84. More particularly, when the slide lock member 76 is moved toward the free end of shaft 40 to disengage the hooks 78 from the slot 80' in the slotted pin 80, the slotted pin 80 is rotated 90° so that the projecting members 82 are aligned with the elongate opening 84' in the locking bracket 84 and may extend therethrough within the locking bracket 84, after which the slotted pin is again rotated back 90° so that the projecting member is locked within the locking bracket 84 and the slide lock member 76 is slid toward the mounted end of the shaft 40 to again engage the J-hooks 78 in the slot 80' of the slotted pin 80 so that it cannot be rotated and so that the projecting member 82 remains locked within the locking bracket 84.

The swivel-handle 70 also has slide blocking projections 70" formed thereon to prevent the handle from being slid toward the free end of the main support shaft 40 when in the storage, horizontal position thereof, while the padlock as connected through the opening 70' in the handle 70 maintains the handle in secure engagement with the bracket 74 when in the horizontal position of the shaft 40. A locking pin (not shown) is inserted through the depicted openings provided in the telescopic, sliding members 86, 88 of the rigid, lateral support member 10 for locking the members 86, 88 in different positions thereof, and again a lock could be inserted through an opening defined in an end of the pin for locking the members in a selected position. Preferably, the member 86 is a tubular member and has a pair of openings provided in a lower surface thereof which align with the fastening means 87' for accessing same, while the sliding member 88 has a continuous lower surface so that the fastening means 87', and hence the auxiliary support means 10, may not be removed when the members 86, 88 are in a locked position thereof because the member 88 will be covering the access openings in the member 86. Also, the member 86 has an opening in an upper surface thereof for being fitted over the head of the bolt associated with the nut 62.

Indicated at 90 is an optional clamp which would be used for temporarily supporting the slotted pin 80 and an appropriate orientation thereof for assembly. The J-pins 78 will preferably have pointed ends, and the slot 80' in the slotted pin 80 will preferably have tapered surfaces so as to facilitate and assure easy entry of the J-pins into the slot 80'. The slide lock member 76 is preferably a hollow member with a rounded insert 76" fixed within an upper end thereof for fixing the lower ends of the J-pins 78 to the member 76 and the rounded nature of the insert 76" is preferred such that the electrical leads 58 of the utility light 12 may extend through the member 76 with little or no possibility that the leads will be damaged (such as by being pinched) as the slide lock member 76 is moved within the shaft 40.

Although the rigid lateral support means 10 as shown and described is preferred according to the invention, it is possible to include an alternative type of lateral support for use in securing the load carrying means 4 in a storage position thereof. For example, a fixed, locking bracket could be mounted to the vehicle bumper at an appropriate location, or an arm could be pivotably or slidably attached to a lower portion of the bumper, with a free end thereof being pivotable or slidable rearwardly of the bumper to an appropriate location where the load carrying means 4 could be secured thereto. Such an arm could have a locking bracket such as the bracket 84 thereon, or could have an opening therein, for being attached to the load carrying means.

The stand plate 14 is very desirable and advantageous when using the device 1 because a person may stably stand thereon for loading objects onto or off of the top of the vehicle to which it is attached, for hitching a trailer to the hitch means 2, cranking a winch on the trailer when the trailer is in water, etc. Preferably, the stand plate has a non-slip surface such as grooves defined in or a plastic mat provided on the upper surface thereof, and has a sufficiently large surface area to fully accommodate both feet of an individual. The license plate bracket 16 is preferably mounted to the bracket 60 using a bolt 17 as shown.

Referring to FIGS. 7, 8, 9, and 9a of the drawings, there is shown a load securing device according to a second preferred embodiment thereof. The second embodiment is identical to the first embodiment in all aspects except the fastening means 106 thereof, the theft deterrence means 108 thereof, and a lower portion of the main shaft 140 thereof. All other components are the same as in the first embodiment and will not be discussed further. As shown, the fastening means 106 includes a face bracket 60 which is identical to the bracket 60 of the first embodiment except that it does not have a pivot bracket 66 connected to a lower portion thereof. Additionally, the fastening means 106 includes a second face bracket 162 connected to the first bracket 60 so as to define a channel therebetween, and a second anti-scratch gasket 61 provided on a rear surface of the second bracket 162. Further, the fastening means 106 includes a modified swivel-handle 170 which does not need slide-preventing blocks thereon and a modified receiver 172 for a fastening member 171 and a swivel-handle. The receiver 172 is fixed to an upper end of the second bracket 162 with a pair of bolts 172' that normally project rearwardly from a rear face of the bracket 162 for selective operative engagement with opening 140" defined in one face of the main support shaft 140 when the shaft is in a horizontal, storage position thereof. The shaft 140 also has another elongate opening 140''', both of which openings extend from near the bottom of the shaft to approximately the middle of the shaft for permitting the fastener 171 to slide therealong as discussed further below; and the lower end of the shaft 140 will have a reduced inner perimeter for snugly engaging the nut 62, noting that the slide lock member is not used in this embodiment.

More particularly, for use of the load carrying means 104 according to the second preferred embodiment of the invention, the shaft 140 is installed in an erect, operative position thereof by sliding the lower end thereof into the channel between the two face brackets 60, 162 and downwardly over the nut 62, inserting the fastening member 171 through the upper recess 60' in the face bracket 60, and through the elongate openings 140", 140''' and tightly threading the fastening member 171 into the central threaded opening 172" of the receiver 172 for clamping the support shaft 140 to the face brackets 60, 162. The handle of the swivel-handle member 170 is then pivoted such that the free end thereof extends into the elongate slot 140''' in the main support shaft 140 and a locking pin 175 is inserted through openings defined in opposite sides of the main support shaft 140 and through the opening 170' defined in the free end of the handle 170. Locks 176 are provided on the opposite ends of the locking pin 175 to secure the swivel-handle 170 against further cranking so that the main shaft is thus fixed in place by the face brackets and the nut 62.

According to the second embodiment, when it is desired to move the main support shaft to the storage, substantially horizontal position thereof, the cranking handle 170 is loosened in its threaded engagement with the receiver 172, the main support shaft 140 is lifted upwardly from its engagement with the upstanding nut 62 (which is permitted because of the fastener 171 slides along the elongate slots 140"), 140''' of the main support shaft 140, the main support shaft is then slid back along the elongate openings 140", 140''' such that a substantially central portion of the shaft 140 is centered over the face brackets 60, 162, the cranking handle is then re-tightened in its engagement with the receiver 172, the free end of the handle 170 is rotated into the elongate slot 140''', and the locking pin 175 is then inserted through the opening in the shaft 140 and the opening 170' in the handle 170 and the locks are provided on opposite ends of the locking pin to secure the support shaft in a horizontal, storage position thereof. When the shaft 140 is in the storage position thereof the projecting heads of bolts 172' extend into the slot 140" on opposite sides of the fastener 171 as generally shown in FIG. 8, for stabilizing the shaft against rotation about the fastener 171.

Although there have been described what are at present considered to be the most preferred embodiments thereof, it will be understood that variations and modifications may be made therein without departing from the spirit and essential characteristics of the invention. The scope of the invention is, therefore, indicated by appended claims, rather than by the foregoing description.

I claim:

1. A load securing device for a vehicle, the device comprising:

hitch means securable to a vehicle for selectively fixing a trailer to the vehicle for being towed thereby;

load carrying means for carrying loads externally of the vehicle; and fastening means for fastening said load carrying means to said hitch means such that both the load carrying means and the hitch means may be simultaneously used;

said load carrying means including a main support shaft; and said fastening means being adjustable for fixing said main support shaft to said hitch means in different stable positions of the main support shaft, including an operative substantially vertical position and a storage position in which the main support shaft extends substantially horizontally.

2. A load securing device according to claim 1, wherein:

said hitch means is adjustable such that a trailer-engaging hitching member thereof may be stably disposed anywhere within a range of vertical levels relative to the vehicle.

3. A load securing device according to claim 1, wherein:

said load carrying means further includes an arm structure extendable away from said main support shaft, said arm structure being collapsible toward said main support shaft substantially parallel thereto.

4. A load securing device according to claim 1, wherein:

said load carrying means is adjustable into different, extended, operative positions for carrying different size and different shape objects, the load carrying means including a collapsible arm structure and at least one relocatable, load engaging member selectively connectable to different portions of said collapsible arm structure.

5. A load securing device according to claim 1, further including:

theft deterrence means operatively connectible to said fastening means for preventing said main support shaft from being disconnected from said fastening means and for locking said fastening means against adjustment in said different, stable positions of said main support shaft.

6. A load securing device according to claim 5, wherein:

said fastening means includes a cranking handle and said theft deterrence means includes a lock which secures said handle to at least one of said load carrying means and said fastening means such that said handle cannot be cranked.

7. A load securing device according to claim 1, further including:

a locking bracket disposed on the vehicle near said load carrying means; and theft deterrence means for selectively securing said main support shaft to said locking bracket in said storage position thereof.

8. A load securing device according to claim 7, wherein:

said theft deterrence means includes a moveable member extending from said main support shaft, said moveable member being moveable into locking engagement with said locking bracket, and means for preventing said moveable member from being moved.

9. A load securing device according to claim 8, wherein:

said preventing means includes a sliding member disposed within said main support shaft which is slidable into engagement with a portion of said moveable member also within said main support shaft to prevent said moveable member from being moved.

10. A load securing device according to claim 1, further including:

a stand plate fixed to said hitch means outwardly of the vehicle, said stand plate having a surface area sufficient to support the feet of an individual, and including a planar surface extending laterally of said hitch means.

11. A load securing device according to claim 1, wherein said fastening means fastens different portions of said main support shaft in said operative and storage positions thereof.

12. A load securing device for a vehicle, the device comprising:

a support base connectable to the vehicle;

load carrying means for carrying loads externally of the vehicle;

said load carrying means including a single main support shaft; and adjustable fastening means for fixing said main support shaft to the support base in different stable positions of the main support shaft including an operative, upright position extending upwardly from said support base and a storage position in which said main support shaft is substantially horizontal.

13. A load securing device according to claim 12, wherein said load carrying means includes an adjustable arm structure for carrying loads of different shapes and sizes in an operative position thereof, the adjustable arm structure including at least one relocatable load engaging member selectively connectable to different portions of said adjustable arm structure.

14. A load securing device according to claim 12, wherein said load carrying means further includes support arm means for having loads secured thereto, said support arm means extends away from said single main support shaft in an operative position thereof, and said support arm means is at least one of collapsible toward said main support shaft and disengagable from said main support shaft.

15. A load securing device according to claim 12, wherein said load carrying means further includes support arm means operatively connected to said single main support shaft, said support arm means being collapsible toward said main support shaft substantially parallel thereto and said support arm means being relocatable such that it can be connected to different portions of said load carrying means.

16. Adjustable object hitch for a vehicle, said hitch including:

mounting bracket means for being fixed to a vehicle; and adjustable hitch means connectible to said mounting bracket means, said adjustable hitch means including an object hitching member and means for stably supporting said object hitching member anywhere within a range of vertical positions relative to the vehicle, said supporting means including a slidable hitch bracket, and first and second fastening means for fastening the slidable hitch bracket to said mounting bracket means, said first and second fastening means extending in different directions, substantially perpendicular to each other.

17. An adjustable object hitch according to claim 16, wherein said object hitching member is a trailer hitching member connectable to said slidable hitch bracket, said mounting bracket means having an opening defined therein for having one of said first and second fastening means connected thereto, and said trailer hitching member is also selectively connectable to said opening defined in said mounting bracket means in an operative position of the trailer hitching member.

18. A load securing kit, comprising:

hitch means adapted to be connected to a vehicle for towing an object from the vehicle;

load carrying means adapted to be connected to the vehicle for carrying external loads on the vehicle; and fastening means for selectively fastening said load carrying means to the vehicle or said hitch means, and for selectively fastening the load carrying means to the hitch means such that the load carrying means and the hitch means may be simultaneously used;

said load carrying means including a main support shaft;

said fastening means is adapted to selectively fix the main support shaft in different stable positions thereof, including an erect operative position in which said main support shaft extends substantially vertically and a storage position in which said main support shaft extends substantially horizontally.

19. A load securing kit according to claim 18, wherein said load carrying means further includes support arm means extendable away from said main support shaft for having loads secured thereto, and said support arm means being collapsible toward said main support shaft substantially parallel thereto.

20. A load carrying device for securing loads to a vehicle the device comprising:

a support base for being fixed to a vehicle;

load carrying means for carrying loads thereon, said load carrying means including a single main support shaft;

fastening means for removably fastening said main support shaft to said support base;

said load carrying means including support arm means operatively connected to said main support shaft, said support arm means being collapsible into a compact arrangement;

said fastening means includes first means for operatively engaging a lower end of said main support shaft to prevent non-vertical movement of the main support shaft relative to said support base, and second means for selectively clamping an intermediate portion of said main support shaft to said support base;

said first means including a first member extending upwardly from said support base to operatively engage the lower end of said main support shaft; and said second means including a crankable handle.

\* \* \* \* \*

UNITED STATES PATENT AND TRADEMARK OFFICE
CERTIFICATE OF CORRECTION

PATENT NO : 5,810,542
DATED : 22 September 1998
INVENTOR(S): Jerry Ostrander

It is certified that error appears in the above-identified patent and that said Letters Patent is hereby corrected as shown below:

On the cover sheet, under "[56] References cited", correct the spelling of "Lovei" to --Lovci--.
Column 1, on the line numbered between 18 and 19, change "there behind" to --therebehind--;
    line 65, change "instruction" to --obstruction--.
Column 3, line 22, change "both" to --loads--;
    line 50, change "fast" to --theft--.
Column 5, line 40, change "is a" to --the--;
    line 49, between "adjustment" and "removal" insert --/--.
Column 7, line 39, change "member" to --members--.
Column 10, line 55, change "sliding" to --slidingly--.
Column 12, line 43, change "60'" to --60"--;
    line 63, delete "of";
    line 64, after "140"" delete the right parenthesis; after "140" insert a right parenthesis.

Signed and Sealed this

Sixth Day of April, 1999

Attest:

Attesting Officer

Q. TODD DICKINSON

Acting Commissioner of Patents and Trademarks